US010001388B2

(12) United States Patent
Hrubes

(10) Patent No.: US 10,001,388 B2
(45) Date of Patent: Jun. 19, 2018

(54) CIRCUIT ARRANGEMENT AND METHOD FOR CONTROLLING A DISPLACEMENT MEASUREMENT SENSOR

(71) Applicant: MICRO-EPSILON Messtechnik GmbH & Co. KG, Ortenburg (DE)

(72) Inventor: Franz Hrubes, Rotthalmuenster (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 0 days. days.

(21) Appl. No.: 15/324,839

(22) PCT Filed: Jul. 7, 2015

(86) PCT No.: PCT/DE2015/200403
§ 371 (c)(1),
(2) Date: Apr. 10, 2017

(87) PCT Pub. No.: WO2016/008483
PCT Pub. Date: Jan. 21, 2016

(65) Prior Publication Data
US 2017/0248443 A1    Aug. 31, 2017

(30) Foreign Application Priority Data

Jul. 15, 2014   (DE) .................. 10 2014 213 741

(51) Int. Cl.
*G01R 27/02*   (2006.01)
*G01D 3/036*   (2006.01)
*G01D 5/20*    (2006.01)

(52) U.S. Cl.
CPC ............ *G01D 3/0365* (2013.01); *G01D 5/20* (2013.01)

(58) Field of Classification Search
CPC ................................ G01D 3/365; G01D 5/20
(Continued)

(56) References Cited

U.S. PATENT DOCUMENTS 3,973,191 A * 8/1976 Zabler .................. G01D 5/2026
324/207.16
4,176,555 A * 12/1979 Dorman .................... G01D 5/14
324/611
(Continued)

FOREIGN PATENT DOCUMENTS

DE   3813732 A1   11/1988
DE   4240739 A1   3/1994
(Continued)

OTHER PUBLICATIONS

The International Bureau of WIPO, International Preliminary Report on Patentability (English translation of Written Opinion) for International Application No. PCT/DE2015/200403, dated Jan. 17, 2017, 7 pages, Switzerland.
(Continued)

Primary Examiner — Tung X Nguyen
Assistant Examiner — Dominic Hawkins
(74) Attorney, Agent, or Firm — Alston & Bird LLP

(57) ABSTRACT

A circuit arrangement (1) for controlling an inductive displacement measurement sensor (2) is described. The displacement measurement sensor has a sensor coil (2), which is supplemented by means of a capacitor ($C_{par}$) to form an oscillating circuit. In addition, the circuit arrangement has an oscillator (3) for generating an excitation signal ($U_{Exciter}$), which excites the oscillating circuit to oscillate. The excitation signal ($U_{Exciter}$) is superimposed with a DC voltage ($U_{temp}$), the amplitude of which changes when the temperature of the sensor coil (2) changes. The sensor coil (2) is connected to a controllable resistor ($R_{var}$). Furthermore, the circuit arrangement (1) has a comparator (4), which compares the DC voltage ($U_{temp}$) with a reference voltage ($U_{tref}$). On the basis of the result of the comparison, the comparator (4) outputs a control voltage ($U_r$), which controls the controllable resistor ($R_{var}$). In a further development of the
(Continued)

circuit arrangement the control of the controllable resistor ($R_{var}$) is designed in such a way that when the temperature of the sensor coil (2) changes and, as a result, the ohmic resistance ($R_{Sensor}$) of the sensor coil (2) also changes, the total resistance consisting of the sensor coil ($R_{Sensor}$) and the controllable resistor ($R_{var}$) is held essentially constant.

18 Claims, 5 Drawing Sheets

(58) Field of Classification Search
USPC .......................................... 324/600, 603, 602
See application file for complete search history.

(56) References Cited

U.S. PATENT DOCUMENTS

| | | | | |
|---|---|---|---|---|
| 4,643,517 | A * | 2/1987 | Ruger | G01C 11/025 359/199.1 |
| 4,879,512 | A * | 11/1989 | Leonard | G01B 7/023 324/207.16 |
| 5,043,661 | A | 8/1991 | Dubey | |
| 5,283,519 | A * | 2/1994 | Patzig | G01B 7/02 324/207.12 |
| 5,760,577 | A * | 6/1998 | Shizuya | G01B 7/00 177/210 EM |
| 5,767,672 | A * | 6/1998 | Guichard | G01V 3/101 324/207.26 |
| 5,886,580 | A * | 3/1999 | Ikeda | H03F 3/191 327/553 |
| 6,023,156 | A * | 2/2000 | Buhler | G05F 1/56 323/282 |
| 6,115,229 | A | 9/2000 | Ahlig et al. | |
| 6,384,596 | B1 * | 5/2002 | Beyer | G01D 5/2006 324/207.16 |
| 2001/0054312 | A1 * | 12/2001 | Czarnek | G01D 5/2046 73/313 |
| 2003/0179003 | A1 * | 9/2003 | Toda | G01D 3/028 324/679 |
| 2009/0302868 | A1 * | 12/2009 | Feucht | G01D 5/2013 324/654 |
| 2010/0302460 | A1 * | 12/2010 | Sasho | H03J 1/0008 348/731 |
| 2012/0019718 | A1 * | 1/2012 | Huang | H04N 21/4122 348/500 |
| 2014/0298785 | A1 * | 10/2014 | Muller | B60T 17/221 60/327 |
| 2015/0084646 | A1 * | 3/2015 | Mirow | G01D 5/20 324/654 |

FOREIGN PATENT DOCUMENTS

| | | |
|---|---|---|
| DE | 19803187 A1 | 7/1999 |
| DE | 19804414 A1 | 8/1999 |
| DE | 19828055 A1 | 12/1999 |
| EP | 0049304 B1 | 5/1985 |
| EP | 1377887 B1 | 5/2006 |
| WO | WO 2001/006269 A1 | 1/2001 |
| WO | WO 2002/084424 A1 | 10/2002 |

OTHER PUBLICATIONS

German Patent and Trade Mark Office, Office Action for Application No. 102014213741.1, dated Apr. 24, 2015, 7 pages, Germany.
International Searching Authority, International Search Report (ISR) and Written Opinion for International Application No. PCT/DE2015/200403, dated Dec. 4, 2015, 12 pages, Netherlands.

* cited by examiner

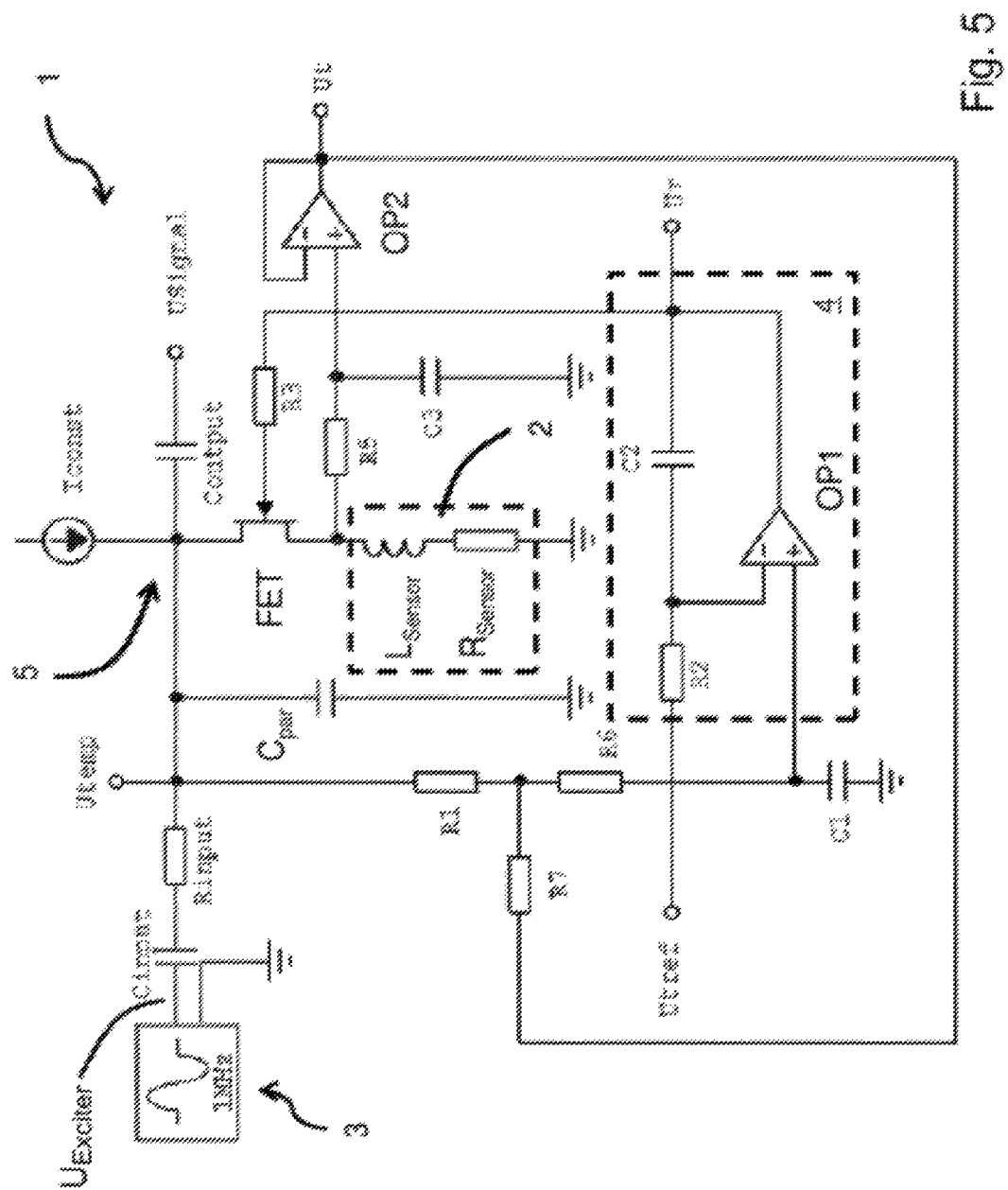

CIRCUIT ARRANGEMENT AND METHOD FOR CONTROLLING A DISPLACEMENT MEASUREMENT SENSOR

CROSS REFERENCE TO RELATED APPLICATIONS

This application is a national stage application, filed under 35 U.S.C. § 371, of International Application No. PCT/DE2015/200403, filed Jul. 7, 2015, which claims priority to German Application No. 10 2014 213 741.1, filed Jul. 15, 2014, the contents of both which as are hereby incorporated by reference herein in their entirety.

BACKGROUND

Technical Field

The invention relates to a circuit arrangement for controlling an inductive displacement measurement sensor, wherein the displacement measurement sensor has a sensor coil, which is supplemented by means of or via a capacitor to form an oscillating circuit, wherein the circuit arrangement has an oscillator for generating an excitation signal, which excites the oscillating circuit to oscillate, wherein a DC voltage $U_{temp}$ is superimposed on the excitation signal, and wherein the DC voltage $U_{temp}$ changes when the temperature of the sensor coil changes. Furthermore, the invention relates to a corresponding method.

Inductive sensors for measuring the displacement (distance, position, profile) comprise at least one sensor coil, which is supplemented by means of or via a capacitor to form an LC oscillating circuit in a number of evaluation circuits that can be used. The oscillating circuit is fed with an excitation signal by means of or via an oscillator through an impedance, usually a resistor, and/or a capacitor. Upon approaching a magnetically and/or electrically conductive object to be measured (also referred to as a target), the amplitude and the phase position of the oscillation at the sensor coil change in relation to the excitation signal. If the circuit is designed as a freely oscillating oscillator, then the oscillator frequency and the amplitude change. These changes are detected by measurement, processed individually or in combination, and outputted as the distance value.

Each sensor coil, which is used in conjunction with displacement measurement systems, has an ohmic resistance, i.e., the real part of the coil impedance, and, thus, a specific quality. The ohmic resistance is temperature dependent. As the temperature rises, the ohmic resistance increases. At the same time the quality of the coil decreases, so that the change in the sensor signal across the distance is reduced. Furthermore, when the temperature changes, the conductivity and the magnetic behavior of the object to be measured also change. Yet this change has only a slight impact on the measuring signal, as compared to the change in resistance. In the event of a large temperature change the measuring signal may change to such an extent that when the distance between the sensor and the object to be measured is held constant, for example, at a maximum distance, the measuring signal simulates a change in the distance that runs through the entire measuring range. If there is no compensation for the temperature-induced changes in the resistance, then the measuring signal will be incapable of measuring the distance in measurement situations, in which the temperature fluctuates widely. This is especially true with respect to sensors that are designed to show only a slight change in the measured value over the measuring range.

Furthermore, the manufacturing tolerances, which are always present in the mass production of sensors, give rise to a number of problems, since manufacturing tolerances lead to a different temperature response of the individual sensors. The temperature response describes the change in the measuring signal when the temperature changes and at the same time there is no change in the measuring distance to an object to be measured. In addition, the installation situation, in particular, with respect to the material effects in the environment of the measurement field, has a major effect on the temperature response. Due to the sources of error listed above, it is necessary to compensate for the temperature, in order to minimize the measurement errors caused by the changes in temperature. At the same time the amount of effort required for such a compensation of the measured value is enormous. The measurement setups vary routinely in the dimensions and the mechanical design of the sensor coil, in terms of the oscillator frequency exciting the sensor coil, with respect to the cable length to the sensor, with respect to the material of the object to be measured, with regard to tolerances, with respect to the installation situation and/or the temperature range to be covered. Depending on the sensor and the measuring range, the temperature response of each sensor is supposed to be determined over the required temperature range for at least two measuring distances, for example, at a short and a long measuring distance. In addition, corresponding correction values are to be calculated.

Description of Related Art

One way to correct the measuring signal is described in the European patent EP 0 049 304 B1. The method, disclosed therein, is based on impressing a direct current into the sensor coil. This arrangement makes it possible to detect not only the ohmic resistance of the sensor coil, but also at the same time the resistance of a connecting cable between the sensor coil and an evaluation unit. In this case the problem is that for a good temperature compensation of the measuring signal the temperature response of the sensor coil, the connecting cable and the object to be measured must match. An adjustment, in particular, by making sure that the temperature coefficients of the resistance of the cable, the sensor coil and the object to be measured match, is associated with a very time-consuming process.

An improvement is disclosed in the European patent EP 1 377 887 B1, in which a separate measurement of the ohmic resistance of the connecting cable is performed. The measured ohmic resistance of the connecting cable is used to compensate separately for the temperature-induced effect of the connecting cable on the measuring signal. However, there is still the problem that the evaluation unit, when combined with various sensors, has to be adjusted individually to each sensor. Such a calibration requires temperature chambers and measuring equipment that are cost intensive in their acquisition. In addition, the calibration is very time consuming, thus, significantly increasing the cost of a sensor.

BRIEF SUMMARY

Therefore, the object of the present invention is to design and further develop a circuit arrangement and a method of the type described in the introductory part in such a way that a measurement with high accuracy at different ambient temperatures is possible at simultaneously the lowest possible cost.

The above engineering object is achieved, according to the present invention, by means of or via the features disclosed in the claims provided herein, according to which the circuit arrangement under discussion is characterized in that the sensor coil is connected to a controllable resistor; that the circuit arrangement has a comparator, which compares the DC voltage with a reference voltage, and that, on the basis of the result of the comparison, the comparator outputs a control voltage, which controls the controllable resistor.

With respect to a method, the aforementioned object is achieved via the steps of:

generating an excitation signal by means of or via an oscillator, superimposing the excitation signal with a DC voltage $U_{temp}$, with the DC voltage $U_{temp}$ changing when the temperature of the sensor coil changes, comparing the DC voltage $U_{temp}$ with a reference voltage by means of or via a comparator, controlling a controllable resistor using the result of the comparison.

First of all, it was found in an inventive manner that in order to achieve an accuracy of measurement that is as high as possible at different temperatures, there is no need to compensate individually for the temperature response of a sensor. In particular, it is possible to dispense with sophisticated calibration measurements in order to determine the temperature response of each sensor and/or to determine correction terms. In fact, it has been found, in particular, in accordance with the present invention that by providing a controllable resistor, which is connected to the sensor coil, and by skillfully controlling said resistor it is possible to respond to various temperature-induced changes and variations in the parameters. For this purpose a DC voltage $U_{temp}$, which is superimposed on the excitation signal, is used; and said DC voltage $U_{temp}$ is coupled into the oscillating circuit, wherein the DC voltage $U_{temp}$ also changes when the temperature of the sensor coil changes. The DC voltage $U_{temp}$ is compared with a reference voltage by means of or via a comparator. The result of the comparison is used to derive a control voltage, which is outputted by the comparator and with which the controllable resistor is controlled. If the temperature of the sensor coil changes and, in so doing, its ohmic resistance and the DC voltage $U_{temp}$ also change, then the control loop, which is designed in such a way, can be used to compensate for the change in the ohmic resistance of the sensor coil or at least to counteract it.

Therefore, it is not necessary to adjust the circuit individually to a particular sensor. The circuit is capable of compensating by itself for the temperature-induced change in the ohmic resistance of different sensors that have mutually different ohmic resistances and temperature responses at a certain temperature due to manufacturing tolerances. Consequently it is possible to integrate different sensors into the circuit without having to calibrate the circuit before the circuit is put into operation. In addition, it is possible to compensate for the temperature-induced changes in the ohmic resistance of the connecting cable as well as for different installation situations, in particular, with respect to the material effects in the environment of the measurement field.

In at least one embodiment the control of the controllable resistor is designed in such a way that when the temperature of the sensor coil changes and, as a result, the ohmic resistance of the sensor coil also changes, the total resistance of the sensor coil and a controllable resistor is held more or less constant. In this way it is possible to compensate for the temperature-induced change in the quality of the oscillating circuit, so that the behavior of the oscillating circuit does not change in essence.

In principle, the sensor coil and the controllable resistor can be connected in different ways. Therefore, a parallel connection would be conceivable; or the controllable resistor could be connected, as part of a voltage divider, to the sensor coil. However, in at least one embodiment the sensor coil and the controllable resistor are connected in series. In this case the controllable resistor can be disposed on the side of the sensor that faces ground. That is, the controllable resistor is connected, for example, with one terminal to ground and with the other terminal to the sensor coil. Then the controllable resistor would be connected to the so-called "cold" end of the sensor. However, it would also be conceivable to dispose the controllable resistor on the so-called "hot" end of the sensor. That is, the controllable resistor is disposed on the side of the sensor coil that faces away from ground. The latter configuration has the advantage that the sensor can be connected to ground with one terminal and can be connected to the other terminal, for example, by means of or via a coaxial cable.

In order to generate a DC voltage $U_{temp}$ with an amplitude that depends on the temperature of the sensor coil, a temperature sensor can be disposed on the sensor coil; and the measured value of said temperature sensor is entered into a controllable DC voltage source. Then this controllable DC voltage source could output the temperature-dependent DC voltage $U_{temp}$.

However, in at least one embodiment the DC voltage $U_{temp}$ is generated by impressing a constant current into the oscillating circuit. The constant current flows through the sensor coil and the controllable resistor. To the extent that the sensor coil and the controllable resistor are connected in parallel, the constant current would be divided between the two branches and, in particular, as a function of the respective resistance of the sensor coil and the controllable resistor. In the case of a series connection of the sensor coil and the controllable resistor, the constant current would flow through the two elements. In all connection cases the DC voltage $U_{temp}$ drops across the sensor coil and the controllable resistor. This configuration has the advantage that a change in the ohmic resistance of the sensor coil has a direct impact on the DC voltage $U_{temp}$. As a result, the temperature response of the sensor coil is reflected directly in the DC voltage $U_{temp}$ again; and consequently there is an even higher degree of freedom with respect to selecting a suitable sensor.

In this embodiment of the invention the DC voltage $U_{temp}$, which drops across the sensor coil and the controllable resistor, changes when the temperature causes a change in the ohmic resistance of the sensor coil. As a result, there is a change in the input voltages that are applied at the comparator, so that the comparison, performed by the comparator, provides a modified result. On the basis of the new result, the comparator outputs a modified control voltage, which in turn changes the resistance value of the controllable resistor. The relationship between the comparison result and the associated control voltage can be selected relatively freely and depends on the implementation of the comparator. Thus, for example, the controllable resistor can be adjusted by changing the control voltage in such a way that a change in the DC voltage $U_{temp}$ is counteracted due to a temperature change in the sensor coil. This can go on until the DC voltage is returned again to the value before the temperature change; and, in so doing, the $U_{temp}$ is held constant or at least largely constant.

The excitation signal, which is superimposed with the DC voltage $U_{temp}$, may be connected to the comparator by means of or via a first low-pass filter. The first low-pass filter is used to filter the AC voltage components out of the excitation signal, which is superimposed with the DC voltage $U_{temp}$. The DC voltage components of the excitation signal, which is superimposed with the DC voltage $U_{temp}$, remain. The first low-pass filter can be an active analog low-pass filter. Such low-pass filters can comprise coils, capacitors and resistors as well as active components, such as, for example, operational amplifiers or transistors. It is also conceivable that the first low-pass filter is designed as a passive low-pass filter. Thus, it may comprise a coil and a resistor. In at least one embodiment the first low-pass filter is formed by a resistor and a capacitor. This configuration is very cost effective and offers in the present case a sufficient filtering effect.

The comparator may be formed in a number of ways. In at least one embodiment the comparator is formed by means of or via an operational amplifier circuit, which comprises a first operational amplifier. This configuration has the advantage that precision comparators can be built at a negligible cost and that, in addition, the behavior of the output signal can be relatively freely defined by suitable wiring. The output of the first operational amplifier can be fed back to the inverting input of the first operational amplifier by way of a capacitor, as a result of which the comparator has an integrating behavior. However, it would also be possible, depending on the type of controllable resistor to be controlled, to arrange a resistor or another impedance in the feedback branch, in order to obtain an additional control voltage. In principle, it is irrelevant which input voltage is connected to the inverting and non-inverting input of the first operational amplifier in the comparator. Preferably, however, the excitation signal, which is superposed with the DC voltage $U_{temp}$, is applied to the non-inverting input. The reference voltage is applied to the inverting input of the first operational amplifier, in particular, by way of a resistor.

The oscillating circuit can be designed as a parallel oscillating circuit. This configuration is particularly advantageous if the DC voltage $U_{temp}$ is generated by impressing a constant current into the oscillating circuit. In this case a direct current path is already available and does not have to be produced separately.

In order to generate a voltage, which can be outputted as a measure for the temperature of the sensor coil, a second low-pass filter may be connected to a connecting point between the controllable resistor and the sensor coil. Then the second low-pass filter is used to filter the AC voltage component out of the excitation signal that is superimposed with the DC voltage $U_{temp}$. The net result is that the DC voltage component, which is a measure for the temperature of the sensor coil, remains. If, for example, the controllable resistor is connected in series to the sensor coil and is disposed at the hot end of the sensor coil, then the DC voltage component, which drops across the sensor coil, would be present at the output of the second low-pass filter. If the controllable resistor is connected in series to the sensor coil, but is disposed at the cold end of the sensor coil, then a DC voltage component, which drops across the controllable resistor, would be present at the output of the second low-pass filter. However, depending on the control that is implemented by means of or via the circuit arrangement of the invention, this voltage would also provide a measure for the temperature of the sensor coil.

The second low-pass filter in turn can be configured as an active or passive low-pass filter. In at least one embodiment the second low-pass filter in turn is formed by a resistor and a capacitor. In this case the term "output of the low-pass filter" means the connecting point between a resistor and a capacitor.

The voltage $U_t$ can be used to adjust the DC voltage $U_{temp}$ or to adjust the reference voltage $U_{tref}$. When the comparator is formed by an operational amplifier circuit, an adjustment of the DC voltage $U_{temp}$ can take place by connecting the voltage $U_t$ to the non-inverting input of the first operational amplifier. In order to adjust the reference voltage, the voltage $U_t$ in this embodiment may be connected to the inverting input of the first operational amplifier. Both variants offer an easy way to compensate for the temperature caused by the material effect of the object to be measured and the effect of the temperature-induced change in the inductance of the sensor coil. The inventor has found that the required change is usually very small and can, therefore, be effected in the standard way.

In order to reduce the load on the oscillating circuit and the second low-pass filter, a second operational amplifier, which is wired as a voltage follower, may be connected to the output of the second low-pass filter. Voltage followers are particularly easy to build with operational amplifiers, where the output of the operational amplifier is connected directly to the inverting input of the operational amplifier; and the input signal is applied to the non-inverting input of the operational amplifier. Thus, the output voltage is approximately the value of the voltage at the non-inverting input, where in this case a very high impedance input is seen by the oscillating circuit; and, as a result, the oscillating circuit is practically unaffected. The voltage $U_t$ can be outputted over the second operational amplifier as the measured value for the temperature of the sensor coil. As an alternative or in addition, the output signal of the second operational amplifier can be used to adjust the voltage $U_{temp}$ or the reference voltage.

Any type of controllable resistor can be used as the controllable resistor. Therefore, digitally adjustable potentiometers can be used for example. In at least one particular embodiment the controllable resistor is formed by a field effect transistor. In this context field effect transistors with a low or very low ON resistance are particularly suitable, since in this case, in particular, in the case of a series connection consisting of a sensor coil and a controllable resistor, the total resistance can be minimized over a relatively wide temperature range; and, in so doing, the quality of the oscillating circuit can be maximized. The term "ON resistance" is defined as the drain-source resistance of a field effect transistor in the fully enabled state or, more specifically, in the saturation region.

When choosing a controllable resistor it is important for said controllable resistor to be able to meet the specifications with respect to an operating temperature range. If, for example, the total resistance consisting of the sensor coil and a controllable resistor and possibly other elements, such as a coaxial connecting cable, are to be held constant, then the controllable resistor has to be adjustable in such a way that all temperature-induced changes of the ohmic resistance, in particular, the ohmic resistance of the sensor coil, can be balanced. If, therefore, for example, in the case of a series connection consisting of a sensor coil and a controllable resistor the ohmic resistance of the sensor coil increases from the lower end of the temperature range to the upper end thereof by an amount $\Delta R$, then the controllable resistor has to be reducible by that amount $\Delta R$.

The excitation signal, outputted by the oscillator, can be connected to the oscillating circuit by way of a coupling impedance. In the simplest configuration this coupling impedance is formed by a resistor. This configuration offers the advantage that the excitation signal is connected to the oscillating circuit unchanged. However, it would also be conceivable to implement the coupling impedance by means of or via a capacitor. The coupling impedance can also be implemented by means of or via a combination of at least one resistor and/or at least one capacitor, for example, by means of or via a series or parallel connection of a resistor with a capacitor.

The circuit uses an excitation signal, which has a fixed frequency and/or a fixed amplitude. Such an arrangement supports, in particular, the evaluation of the measuring signal. In addition, the excitation signal exhibits a sinusoidal course.

The circuit has a measurement output, by means of or via which a measuring signal is outputted that is representative of the measured variable (distance, position, profile). The measuring signal can be coupled out of the circuit through a capacitor, so that the DC voltage components are filtered out. It is also conceivable that the circuit comprises an additional voltage follower (in turn formed by a correspondingly wired operational amplifier), by means of or via which the measuring signal is outputted. The measuring signal at the measurement output can be fed to an evaluation circuit, which conditions the measuring signal in a suitable manner. It would be conceivable, for example, to compare the measuring signal with the excitation signal by means of or via a phase comparator. If the excitation signal has a fixed frequency, then the measuring signal can be easily evaluated. Other options for the evaluation would be phase-selective rectification or frequency and/or amplitude modulation. However, this list is not exhaustive, but rather a number of known methods for conditioning measuring signals can be used at this point.

The displacement measurement sensor may be a sensor that works according to the eddy current principle and that can be used to determine a distance, a position and/or a profile of an object to be measured.

BRIEF DESCRIPTION OF THE FIGURES

At this point there are a number of ways to embody and further develop the teaching of the present invention in an advantageous manner. For this purpose reference is made, on the one hand, to the claims subordinated to claim 1, and, on the other hand, to the following elucidation of exemplary embodiments of the invention based on the drawings. In conjunction with the elucidation of the exemplary embodiments of the invention with reference to the drawings, embodiments and further developments of the teaching are also explained below. In the drawings

FIG. 5 shows a circuit diagram of a fifth exemplary embodiment of an inventive circuit for controlling an eddy current sensor with a field effect transistor as the controllable resistor.

DETAILED DESCRIPTION OF VARIOUS EMBODIMENTS

Figure 1:
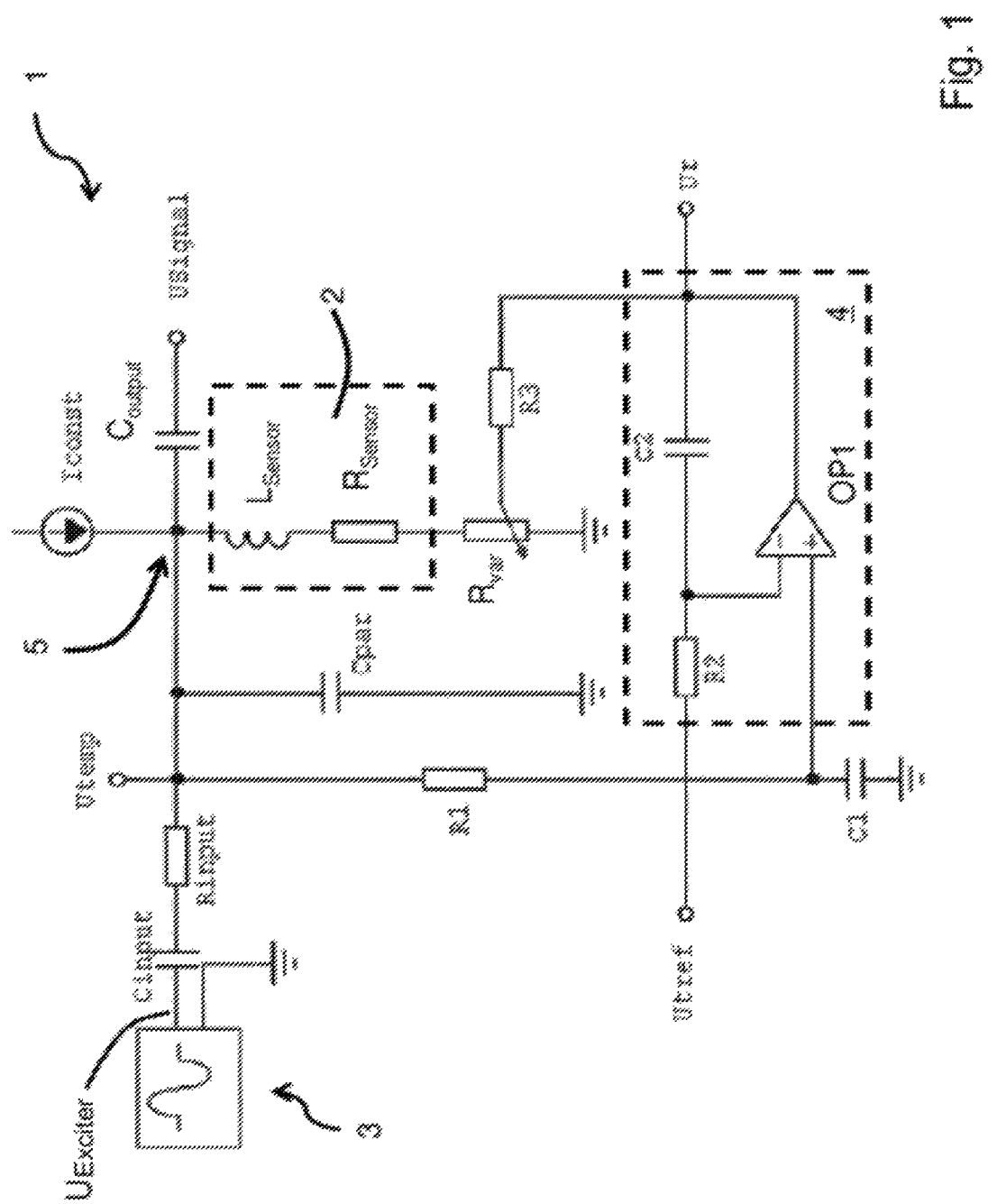
FIG. 1 shows a circuit diagram of a first exemplary embodiment of an inventive circuit for controlling an eddy current sensor, where the controllable resistor is disposed at the "cold" end of the sensor coil.

FIG. 1 shows a circuit diagram of a first exemplary embodiment of an inventive circuit 1 for controlling an eddy current sensor comprising a sensor coil 2. The sensor coil 2, which is shown as an inductance $L_{Sensor}$ as well as its resistance $R_{Sensor}$, in FIG. 1, is supplemented by means of or via a capacitor $C_{par}$, which is connected in parallel to the sensor coil 2 (also referred to as a parallel capacitor), to form an oscillating circuit. The sensor coil 2 is connected with its so-called cold end (at the lower end in the figure) to ground by way of a controllable resistor $R_{var}$. An oscillator 3 generates an excitation signal $U_{Exciter}$ in order to excite the oscillating circuit and is connected to the oscillating circuit by way of a coupling impedance, where in this case the coupling impedance is formed by a series connection consisting of a capacitor $C_{input}$ and a resistor $R_{input}$. As a result, the oscillator 3 feeds the sensor coil 2 at its so-called hot end (the upper end in the figure). In addition, the oscillator 3 is connected to a comparator 4 by way of the coupling impedance and a first low-pass filter. The first low-pass filter is formed by a series connection consisting of a resistor $R_1$ and a capacitor $C_1$. The comparator 4 is implemented by means of or via a first operational amplifier OP1. The output of the first low-pass filter is connected to the non-inverting input of the first operational amplifier OP1. A reference voltage $U_{tref}$ is connected to the inverting input of the first operational amplifier OP1 by way of a resistor $R_2$. In addition, the control voltage $U_r$, which is present at the output of the first operational amplifier OP1, is fed back to the inverting input of the first operational amplifier OP1 by way of a capacitor $C_2$. This arrangement gives the comparator an integrating behavior. The control voltage $U_r$ increases with a positive difference at the input of the first operational amplifier OP1 and decreases with a negative difference. The output of the first operational amplifier OP1 is connected by means of or via a resistor $R_3$ to the control input of the controllable resistor $R_{var}$. A capacitor $C_{output}$, by means of or via which a measuring signal $U_{Signal}$ is coupled out, is connected at the connecting point 5 between the coupling impedance and the oscillating circuit. The measuring signal $U_{Signal}$ can be fed to an evaluation unit, which is not shown.

A constant current $I_{const}$ is impressed into the oscillating circuit. The constant current $I_{const}$ flows through the sensor coil 2 and the controllable resistor $R_{var}$, as a result of which a DC voltage $U_{temp}$ drops across the sensor coil 2 and the controllable resistor $R_{var}$. The DC voltage $U_{temp}$ is superimposed on the excitation signal $U_{Exciter}$. The first low-pass filter filters the AC voltage components out of the excitation signal $U_{Exciter}$ that is superimposed with the DC voltage $U_{temp}$. The net result is that only the DC voltage components and, thus, in essence the DC voltage $U_{temp}$ (minus a very small voltage drop across the resistor R1) are applied to the non-inverting input of the first operational amplifier OP1. The first operational amplifier OP1 compares the voltages present at its inputs. Based on the result of the comparison, the control voltage $U_r$, which is applied to the output of the first operational amplifier OP1, will be adjusted. The control voltage $U_r$ is used to control the controllable resistor $R_{var}$ by means of or via a resistor $R_3$.

When the temperature causes a change in the ohmic resistance $R_{Sensor}$ of the sensor coil 2, the DC voltage $U_{temp}$, which drop across the sensor coil 2 and the controllable resistor $R_{var}$, changes. Usually the resistance $R_{Sensor}$ increases when the temperature increases, so that the DC voltage $U_{temp}$ drops. Due to a change in the DC voltage $U_{temp}$, a voltage, which is applied to the non-inverting input of the first operational amplifier OP1, changes. The net result is that this comparison shows a different result; and the first operational amplifier OP1 outputs a modified control voltage $U_r$ at its output. Based on the modified control voltage $U_r$, the controllable resistor $R_{var}$ is adjusted in such a way that the resistance value of the controllable resistor $R_{var}$ counteracts the resistance change in the sensor coil. In this case the circuit is adjusted in such a way that the total resistance ($R_{Sensor}+R_{var}$) consisting of a controllable resistor $R_{var}$ and an ohmic resistance $R_{Sensor}$ of the sensor coil 2 is returned again to the value before the temperature change. This feature allows the total resistance to be held constant in the event of temperature changes. Even if the circuit in FIG. 1 does not show any additional elements, such as a connecting cable, effects of a target or effects of the installation situation, for reasons of clarity, it is apparent to the person skilled in the art that the control loop, which is implemented in the circuit arrangement according to the invention, is also capable of compensating for its temperature-induced changes.

Figure 2:
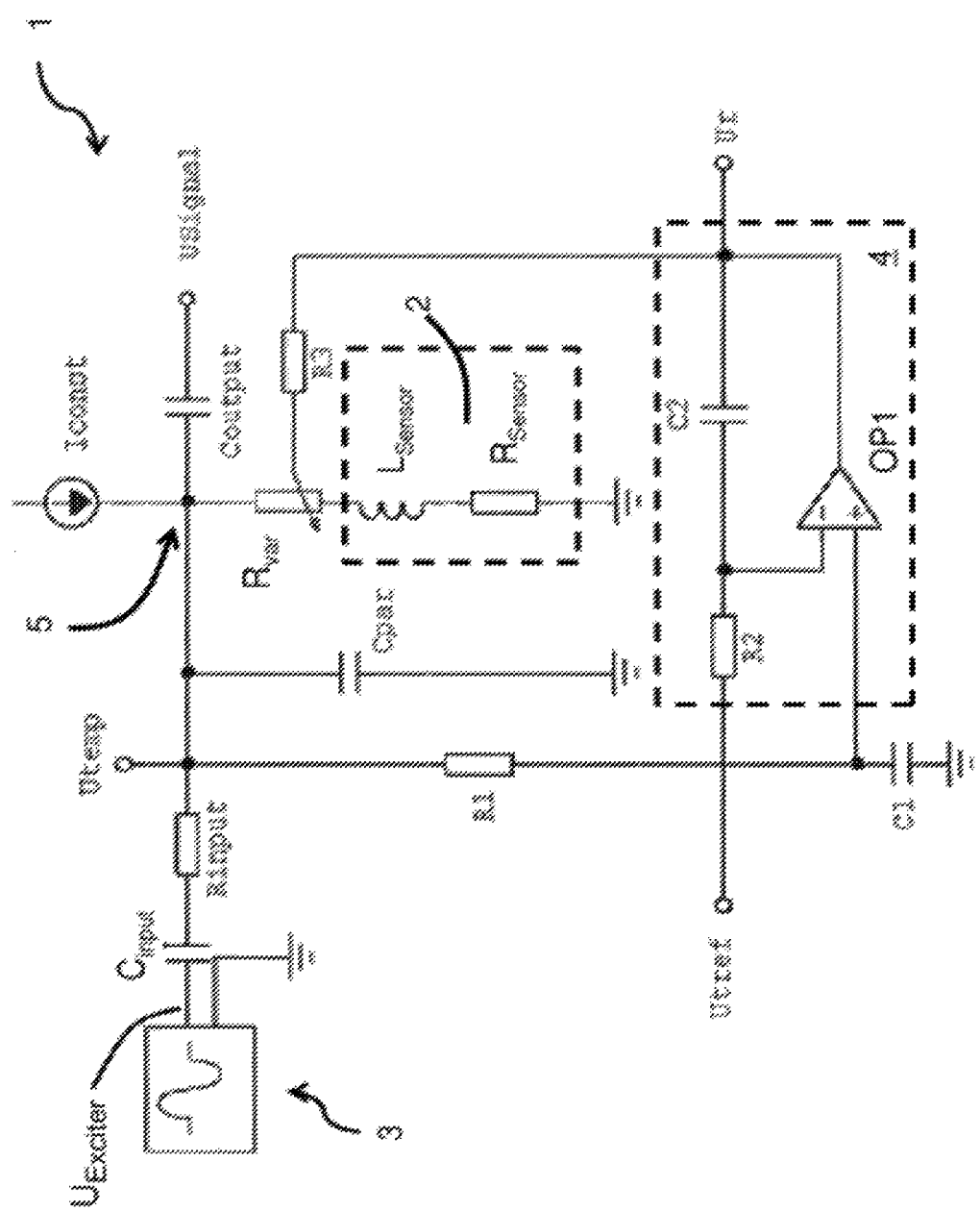
FIG. 2 shows a circuit diagram of a second exemplary embodiment of an inventive circuit for controlling an eddy current sensor, where the controllable resistor is disposed at the "hot" end of the sensor coil.

FIG. 2 shows in essence the circuit from FIG. 1, but in this case a different arrangement of the sensor coil 2 and the adjustable resistor $R_{var}$ is implemented in the oscillating circuit. In FIG. 2 the sensor coil 2 is connected with its cold end to ground and is connected with the hot end to a terminal of the controllable resistor $R_{var}$. The second terminal of the controllable resistor $R_{var}$ is connected to the connecting point 5. The embodiment, according to FIG. 2, has the advantage over the embodiment, according to FIG. 1, that the sensor coil 2 can be connected to its terminal, which is not connected to ground, by means of or via a coaxial cable or any other type of connecting cable.

Figure 3:
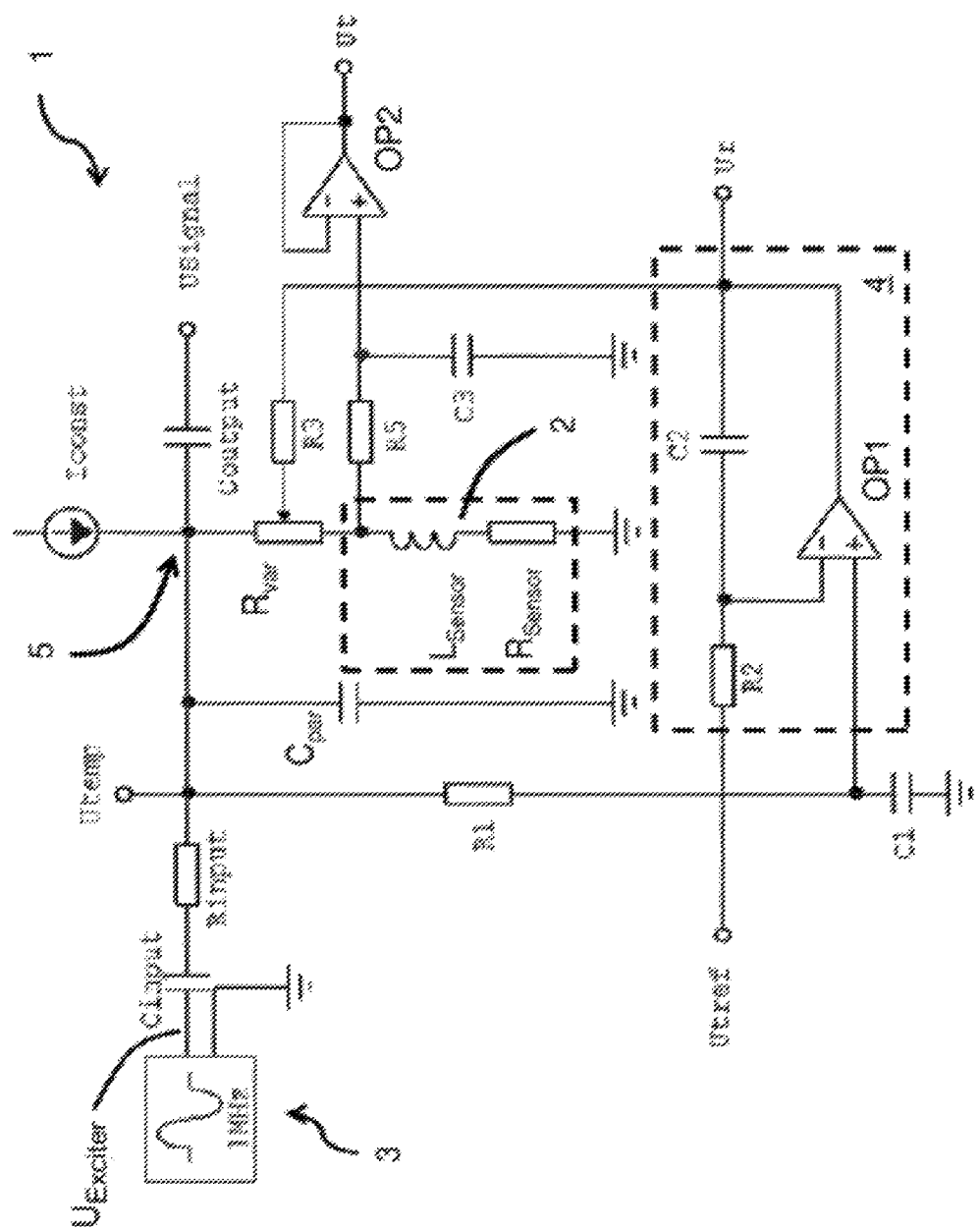
FIG. 3 shows a circuit diagram of a third exemplary embodiment of an inventive circuit for controlling an eddy current sensor with a circuit for outputting the voltage $U_r$.

FIG. 3 shows a further development of the circuit according to FIG. 2. A second low-pass filter is connected between the controllable resistor $R_{var}$ and the sensor coil 2. The second low-pass filter is formed by a resistor $R_5$ and a capacitor $C_3$, and both of them are connected in series. The second low-pass filter is used to filter the AC voltage components out of the excitation signal $U_{Exciter}$, which is superimposed with the DC voltage $U_{temp}$, and, as a result, outputs the DC voltage, which drop across the sensor coil 2. That being the case, a voltage $U_t$ is applied to the output of the second low-pass filter, i.e., at the connecting point between the resistor $R_5$ and the capacitor $C_3$; and this voltage forms a measure for the temperature of the sensor coil 2. The output of the second low-pass filter is connected to the non-inverting input of a second operational amplifier OP2, which is wired as a voltage follower. That is, the output of the second operational amplifier OP2 is fed back to its inverting input. The voltage follower allows the output voltage of the second operational amplifier OP2 to be approximately the value of the voltage $U_t$, where in this case the oscillating circuit sees a very high impedance input, so that the oscillating circuit remains practically unaffected. In the exemplary embodiment according to FIG. 3, the voltage $U_t$ is outputted and is taken into account for further compensations in an evaluation unit (not shown).

Figure 4:
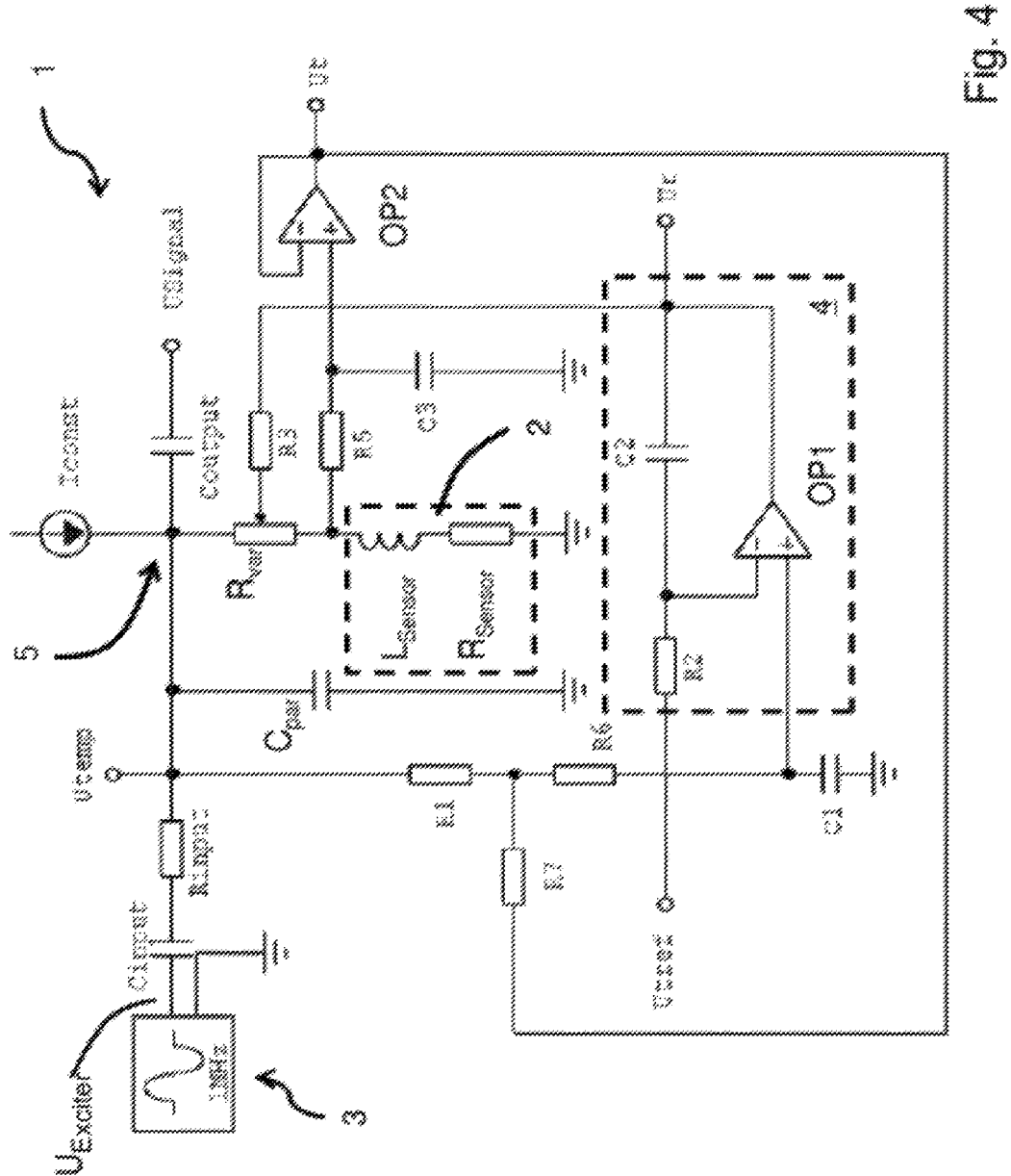
FIG. 4 shows a circuit diagram of a fourth exemplary embodiment of an inventive circuit for controlling an eddy current sensor with an adaptation of the DC voltage $U_{temp}$ by means of or via the voltage $U_t$.

FIG. 4 shows a further development of the circuit according to FIG. 3. In this exemplary embodiment the voltage $U_t$ is used to adapt the DC voltage $U_{temp}$. For this purpose a resistor $R_6$ is supplemented in the first low-pass filter between the resistor $R_1$ and the capacitor $C_1$, and the voltage $U_t$ is connected by means of or via a resistor $R_7$ to the connecting point between the resistors $R_1$ and $R_6$. This arrangement allows the voltage $U_t$ to be added to the DC voltage $U_{temp}$. The net result is that the compensation of temperature changes can be improved to an even greater extent.

In addition, the control voltage $U_r$ and/or the voltage $U_t$ can be applied to the measuring signal for either an additional compensation to compensate for the material effect of the object to be measured and/or to compensate for the effects of, in particular, very small changes in the inductance of the sensor coil in an evaluation circuit, downstream of the circuit.

FIG. 5 shows an exemplary embodiment, in which the controllable resistor $R_{var}$ is formed by a field effect transistor. In this exemplary embodiment the field effect transistor is formed by an n-channel junction field effect transistor FET. Owing to the integrating behavior of the comparator 4, the control voltage $U_r$ is increased until the field effect transistor FET assumes a resistance value that brings the circuit into equilibrium. With each temperature-induced change in the resistance values in the oscillating circuit, the control voltage $U_r$ changes, and, as a result, the resistance of the field effect transistor FET. In this way the total resistance in the oscillating circuit can be held constant.

With respect to other advantageous embodiments of the device according to the invention, it was found in an inventive manner that in order to achieve an accuracy of measurement that is as high as possible at different temperatures, there is no need to compensate individually for the temperature response of a sensor. In particular, it is possible to dispense with sophisticated calibration measurements in order to determine the temperature response of each sensor and/or to determine correction terms. In fact, it has been found, in particular, in accordance with the present invention that by providing a controllable resistor, which is connected to the sensor coil, and by skillfully controlling said resistor it is possible to respond to various temperature-induced changes and variations in the parameters. For this purpose a DC voltage $U_{temp}$, which is superimposed on the excitation signal, is used; and said DC voltage $U_{temp}$ is coupled into the oscillating circuit, wherein the DC voltage $U_{temp}$ also changes when the temperature of the sensor coil changes. The DC voltage $U_{temp}$ is compared with a reference voltage by means of or via a comparator. The result of the comparison is used to derive a control voltage, which is outputted by the comparator and with which the controllable resistor is controlled. If the temperature of the sensor coil changes and, in so doing, its ohmic resistance and the DC voltage $U_{temp}$ also change, then the control loop, which is designed in such a way, can be used to compensate for the change in the ohmic resistance of the sensor coil or at least to counteract it.

Therefore, it is not necessary to adjust the circuit individually to a particular sensor. The circuit is capable of compensating by itself for the temperature-induced change in the ohmic resistance of different sensors that have mutually different ohmic resistances and temperature responses at a certain temperature due to manufacturing tolerances. Consequently it is possible to integrate different sensors into the circuit without having to calibrate the circuit before the circuit is put into operation. In addition, it is possible to compensate for the temperature-induced changes in the ohmic resistance of the connecting cable as well as for different installation situations, in particular, with respect to the material effects in the environment of the measurement field.

In at least one advantageous embodiment the control of the controllable resistor is designed in such a way that when the temperature of the sensor coil changes and, as a result, the ohmic resistance of the sensor coil also changes, the total resistance of the sensor coil and a controllable resistor is held more or less constant. In this way it is possible to compensate for the temperature-induced change in the quality of the oscillating circuit, so that the behavior of the oscillating circuit does not change in essence.

In principle, the sensor coil and the controllable resistor can be connected in different ways. Therefore, a parallel connection would be conceivable; or the controllable resistor could be connected, as part of a voltage divider, to the sensor coil. However, in at least one embodiment the sensor coil and the controllable resistor are connected in series. In this case the controllable resistor can be disposed on the side of the sensor that faces ground. That is, the controllable resistor is connected, for example, with one terminal to ground and with the other terminal to the sensor coil. Then the controllable resistor would be connected to the so-called "cold" end of the sensor. However, it would also be conceivable to dispose the controllable resistor on the so-called "hot" end of the sensor. That is, the controllable resistor is disposed on the side of the sensor coil that faces away from ground. The latter configuration has the advantage that the sensor can be connected to ground with one terminal and can be connected to the other terminal, for example, by means of or via a coaxial cable.

In order to generate a DC voltage $U_{temp}$ with an amplitude that depends on the temperature of the sensor coil, a temperature sensor can be disposed on the sensor coil; and the measured value of said temperature sensor is entered into a controllable DC voltage source. Then this controllable DC voltage source could output the temperature-dependent DC voltage $U_{temp}$.

However, in at least one embodiment the DC voltage $U_{temp}$ is generated by impressing a constant current into the oscillating circuit. The constant current flows through the sensor coil and the controllable resistor. To the extent that the sensor coil and the controllable resistor are connected in parallel, the constant current would be divided between the two branches and, in particular, as a function of the respective resistance of the sensor coil and the controllable resistor. In the case of a series connection of the sensor coil and the controllable resistor, the constant current would flow through the two elements. In all connection cases the DC voltage $U_{temp}$ drops across the sensor coil and the controllable resistor. This configuration has the advantage that a change in the ohmic resistance of the sensor coil has a direct impact on the DC voltage $U_{temp}$. As a result, the temperature response of the sensor coil is reflected directly in the DC voltage $U_{temp}$ again; and consequently there is an even higher degree of freedom with respect to selecting a suitable sensor.

In this embodiment of the invention the DC voltage $U_{temp}$, which drops across the sensor coil and the controllable resistor, changes when the temperature causes a change in the ohmic resistance of the sensor coil. As a result, there is a change in the input voltages that are applied at the comparator, so that the comparison, performed by the comparator, provides a modified result. On the basis of the new result, the comparator outputs a modified control voltage, which in turn changes the resistance value of the controllable resistor. The relationship between the comparison result and the associated control voltage can be selected relatively freely and depends on the implementation of the comparator. Thus, for example, the controllable resistor can be adjusted by changing the control voltage in such a way that a change in the DC voltage $U_{temp}$ is counteracted due to a temperature change in the sensor coil. This can go on until the DC voltage is returned again to the value before the temperature change; and, in so doing, the $U_{temp}$ is held constant or at least largely constant.

The excitation signal, which is superimposed with the DC voltage $U_{temp}$, may be connected to the comparator by means of or via a first low-pass filter. The first low-pass filter is used to filter the AC voltage components out of the excitation signal, which is superimposed with the DC voltage $U_{temp}$. The DC voltage components of the excitation signal, which is superimposed with the DC voltage $U_{temp}$, remain. The first low-pass filter can be an active analog low-pass filter. Such low-pass filters can comprise coils, capacitors and resistors as well as active components, such as, for example, operational amplifiers or transistors. It is also conceivable that the first low-pass filter is designed as a passive low-pass filter. Thus, it may comprise a coil and a resistor. In at least one embodiment the first low-pass filter is formed by a resistor and a capacitor. This configuration is very cost effective and offers in the present case a sufficient filtering effect.

The comparator may be formed in a number of ways. In at least one embodiment the comparator is formed by means of or via an operational amplifier circuit, which comprises a first operational amplifier. This configuration has the advantage that precision comparators can be built at a negligible cost and that, in addition, the behavior of the output signal can be relatively freely defined by suitable wiring. The output of the first operational amplifier can be fed back to the inverting input of the first operational amplifier by way of a capacitor, as a result of which the comparator has an integrating behavior. However, it would also be possible, depending on the type of controllable resistor to be controlled, to arrange a resistor or another impedance in the feedback branch, in order to obtain an additional control voltage. In principle, it is irrelevant which input voltage is connected to the inverting and non-inverting input of the first operational amplifier in the comparator. In certain embodiments, however, the excitation signal, which is superposed with the DC voltage $U_{temp}$, is applied to the non-inverting input. The reference voltage is applied to the inverting input of the first operational amplifier, in particular, by way of a resistor.

The oscillating circuit can be designed as a parallel oscillating circuit. This configuration is particularly advantageous if the DC voltage $U_{temp}$ is generated by impressing a constant current into the oscillating circuit. In this case a direct current path is already available and does not have to be produced separately.

In order to generate a voltage, which can be outputted as a measure for the temperature of the sensor coil, a second low-pass filter may be connected to a connecting point between the controllable resistor and the sensor coil. Then the second low-pass filter is used to filter the AC voltage component out of the excitation signal that is superimposed with the DC voltage $U_{temp}$. The net result is that the DC voltage component, which is a measure for the temperature of the sensor coil, remains. If, for example, the controllable resistor is connected in series to the sensor coil and is disposed at the hot end of the sensor coil, then the DC voltage component, which drops across the sensor coil, would be present at the output of the second low-pass filter.

If the controllable resistor is connected in series to the sensor coil, but is disposed at the cold end of the sensor coil, then a DC voltage component, which drops across the controllable resistor, would be present at the output of the second low-pass filter. However, depending on the control that is implemented by means of or via the circuit arrangement of the invention, this voltage would also provide a measure for the temperature of the sensor coil.

The second low-pass filter in turn can be configured as an active or passive low-pass filter. In at least one embodiment the second low-pass filter in turn is formed by a resistor and a capacitor. In this case the term "output of the low-pass filter" means the connecting point between a resistor and a capacitor.

The voltage $U_t$ can be used to adjust the DC voltage $U_{temp}$ or to adjust the reference voltage $U_{tref}$. When the comparator is formed by an operational amplifier circuit, an adjustment of the DC voltage $U_{temp}$ can take place by connecting the voltage $U_t$ to the non-inverting input of the first operational amplifier. In order to adjust the reference voltage, the voltage $U_t$ in this embodiment may be connected to the inverting input of the first operational amplifier. Both variants offer an easy way to compensate for the temperature caused by the material effect of the object to be measured and the effect of the temperature-induced change in the inductance of the sensor coil. The inventor has found that the required change is usually very small and can, therefore, be effected in the standard way.

In order to reduce the load on the oscillating circuit and the second low-pass filter, a second operational amplifier, which is wired as a voltage follower, may be connected to the output of the second low-pass filter. Voltage followers are particularly easy to build with operational amplifiers, where the output of the operational amplifier is connected directly to the inverting input of the operational amplifier, and the input signal is applied to the non-inverting input of the operational amplifier. Thus, the output voltage is approximately the value of the voltage at the non-inverting input, where in this case a very high impedance input is seen by the oscillating circuit; and, as a result, the oscillating circuit is practically unaffected. The voltage $U_t$ can be outputted over the second operational amplifier as the measured value for the temperature of the sensor coil. As an alternative or in addition, the output signal of the second operational amplifier can be used to adjust the voltage $U_{temp}$ or the reference voltage.

Any type of controllable resistor can be used as the controllable resistor. Therefore, digitally adjustable potentiometers can be used for example. In one particular embodiment the controllable resistor is formed by a field effect transistor. In this context field effect transistors with a low or very low ON resistance are particularly suitable, since in this case, in particular, in the case of a series connection consisting of a sensor coil and a controllable resistor, the total resistance can be minimized over a relatively wide temperature range; and, in so doing, the quality of the oscillating circuit can be maximized. The term "ON resistance" is defined as the drain-source resistance of a field effect transistor in the fully enabled state or, more specifically, in the saturation region.

When choosing a controllable resistor it is important for said controllable resistor to be able to meet the specifications with respect to an operating temperature range. If, for example, the total resistance consisting of the sensor coil and a controllable resistor and possibly other elements, such as a coaxial connecting cable, are to be held constant, then the controllable resistor has to be adjustable in such a way that all temperature-induced changes of the ohmic resistance, in particular, the ohmic resistance of the sensor coil, can be balanced. If, therefore, for example, in the case of a series connection consisting of a sensor coil and a controllable resistor the ohmic resistance of the sensor coil increases from the lower end of the temperature range to the upper end thereof by an amount $\Delta R$, then the controllable resistor has to be reducible by that amount $\Delta R$.

The excitation signal, outputted by the oscillator, can be connected to the oscillating circuit by way of a coupling impedance. In the simplest configuration this coupling impedance is formed by a resistor. This configuration offers the advantage that the excitation signal is connected to the oscillating circuit unchanged. However, it would also be conceivable to implement the coupling impedance by means of or via a capacitor. The coupling impedance can also be implemented by means of or via a combination of at least one resistor and/or at least one capacitor, for example, by means of or via a series or parallel connection of a resistor with a capacitor.

The circuit uses an excitation signal, which has a fixed frequency and/or a fixed amplitude. Such an arrangement supports, in particular, the evaluation of the measuring signal. In addition, the excitation signal exhibits a sinusoidal course.

The circuit has a measurement output, by means of which a measuring signal is outputted that is representative of the measured variable (distance, position, profile). The measuring signal can be coupled out of the circuit through a capacitor, so that the DC voltage components are filtered out. It is also conceivable that the circuit comprises an additional voltage follower (in turn formed by a correspondingly wired operational amplifier), by means of which the measuring signal is outputted. The measuring signal at the measurement output can be fed to an evaluation circuit, which conditions the measuring signal in a suitable manner. It would be conceivable, for example, to compare the measuring signal with the excitation signal by means of or via a phase comparator. If the excitation signal has a fixed frequency, then the measuring signal can be easily evaluated. Other options for the evaluation would be phase-selective rectification or frequency and/or amplitude modulation. However, this list is not exhaustive, but rather a number of known methods for conditioning measuring signals can be used at this point.

The displacement measurement sensor may be a sensor that works according to the eddy current principle and that can be used to determine a distance, a position and/or a profile of an object to be measured.

Finally it is explicitly pointed out that the above described exemplary embodiments of the inventive circuit serve only to elucidate the claimed teaching, but do not limit said teaching to the exemplary embodiments.

LIST OF REFERENCE NUMERALS AND SYMBOLS 1 circuit
2 sensor coil
3 oscillator
4 comparator
5 connecting point
$U_{Exciter}$ excitation signal
$U_{temp}$ DC voltage (superimposed on the excitation signal)
$U_{tref}$ reference voltage
$U_r$ control voltage $U_t$ voltage (representative of the temperature of the sensor coil)
$U_{Signal}$ measuring signal (representative of the measured path or distance)
$I_{const}$ constant current
$R_{var}$ controllable resistor
$R_{Sensor}$ ohmic resistance of the sensor
$L_{Sensor}$ sensor inductance
$C_{par}$ parallel capacitor

The invention claimed is:

1. Circuit arrangement for controlling an inductive displacement measurement sensor, wherein the displacement measurement sensor has a sensor coil (2), which is supplemented via a capacitor ($C_{par}$) to form an oscillating circuit, the circuit arrangement comprising:
    an oscillator (3) for generating an excitation signal ($U_{Erreger}$), which excites the oscillating circuit to oscillate; and
    a comparator (4), which compares a DC voltage $U_{temp}$ with a temperature-independent reference voltage ($U_{tref}$),
    wherein:
        the DC voltage $U_{temp}$ is superimposed on the excitation signal ($U_{Erreger}$),
        the DC voltage $U_{temp}$ changes when the temperature of the sensor coil (2) changes, the sensor coil (2) being connected to a controllable resistor ($R_{var}$), and
        the comparator (4) outputs a control voltage ($U_r$) that is dependent upon the result of the comparison of the DC voltage $U_{temp}$ them with a reference voltage ($U_{tref}$), the control voltage ($U_r$) being configured to control the controllable resistor ($R_{var}$).

2. Circuit arrangement as claimed in claim 1, wherein: the control of the controllable resistor ($R_{var}$) is configured such that when the temperature of the sensor coil (2) changes and, as a result, the ohmic resistance ($R_{Sensor}$) of the sensor coil (2) also changes, the total resistance consisting of a sensor coil ($R_{Sensor}$) and the controllable resistor ($R_{var}$) remains essentially constant.

3. Circuit arrangement as claimed in claim 1, wherein the sensor coil (2) and the controllable resistor ($R_{var}$) are connected in series.

4. Circuit arrangement as claimed in claim 1, wherein the DC voltage $U_{temp}$ is generated by impressing a constant direct current ($I_{const}$) into the oscillating circuit.

5. Circuit arrangement as claimed in claim 1, wherein in order to filter out a DC voltage component, the excitation signal ($U_{Erreger}$), which is superimposed with the DC voltage $U_{temp}$, is connected to the comparator (4) via a first low-pass filter.

6. Circuit arrangement as claimed in claim 1, wherein:
    the comparator (4) comprises a first operational amplifier (OP1), and
    the reference voltage ($U_{tref}$) is connected to an inverted input of the first operational amplifier (OP1).

7. Circuit arrangement as claimed in claim 6, wherein:
    the excitation signal ($U_{Erreger}$), superimposed with the DC voltage $U_{temp}$, is connected to a non-inverting input of the first operational amplifier (OP1), and
    the output of the first operational amplifier (OP1) is fed back by way of a capacitor ($C_2$) to the inverting input of the first operational amplifier (OP1).

8. Circuit arrangement as claimed in claim 1, wherein the oscillating circuit is a parallel oscillating circuit.

9. Circuit arrangement as claimed in claim 1, wherein:
    a second low-pass filter is connected at a connecting point between the controllable resistor ($R_{var}$) and the sensor coil (2), and
    a voltage $U_t$ is applied to an output of the second low-pass filter as a measure for the temperature of the sensor coil (2).

10. Circuit arrangement as claimed in claim 9, wherein:
    a second operational amplifier (OP2), which is wired as a voltage follower, is connected at the output of the second low-pass filter, and
    the voltage $U_t$ can be outputted via the second operational amplifier (OP2).

11. Circuit arrangement as claimed in claim 6, wherein:
    in order to adjust the DC voltage $U_{temp}$, the voltage $U_t$ is connected to a non-inverted input of the first operational amplifier (OP1), and,
    in order to adjust the reference voltage ($U_{tref}$), the voltage $U_t$ is connected to the inverted input of the first operational amplifier (OP1).

12. Circuit arrangement as claimed in claim 1, wherein the controllable resistor ($R_{var}$) is formed by a field effect transistor (FET).

13. Circuit arrangement as claimed in claim 12, wherein the field effect transistor (FET) is an n-channel junction field effect transistor.

14. Circuit arrangement as claimed in claim 1, wherein:
    the excitation signal ($U_{Erreger}$) is connected to the oscillating circuit via a coupling impedance, and
    the coupling impedance is formed by at least one of a resistor ($R_{input}$) or a capacitor ($C_{input}$).

15. Circuit arrangement as claimed in claim 1, wherein:
    the excitation signal ($U_{Erreger}$) has at least one of a fixed frequency or a fixed amplitude, and
    the excitation signal ($U_{Erreger}$) has a sinusoidal course.

16. Circuit arrangement as claimed in claim 1, wherein the circuit (1) comprises a measuring output, at which a measuring signal ($U_{signal}$), which is representative of the measured distance, is outputted.

17. Circuit arrangement as claimed in claim 1, wherein:
    the displacement measurement sensor is a sensor that works according to the eddy current principle, and
    at least one of a distance, a position, or a profile of an object to be measured can be determined via the displacement measurement sensor.

18. Method for controlling a displacement measurement sensor, in particular, by using a circuit arrangement as claimed in claim 1, wherein the displacement measurement sensor comprises a sensor coil (2) that is supplemented via a capacitor ($C_{par}$) to form an oscillating circuit, said method comprising the steps of:
    generating an excitation signal ($U_{Erreger}$) via an oscillator (3),
    superimposing the excitation signal ($U_{Erreger}$) with a DC voltage ($U_{temp}$), wherein the DC voltage $U_{temp}$ changes when the temperature of the sensor coil (2) changes,
    comparing, via a comparator (4), the DC voltage ($U_{temp}$) with a temperature-independent reference voltage ($U_{tref}$), and
    controlling, with a control voltage ($U_r$) output from the comparator (4) and dependent upon the result of the comparison, a controllable resistor ($R_{var}$).

* * * * *